(12) United States Patent
Mayer et al.

(10) Patent No.: US 11,733,365 B2
(45) Date of Patent: Aug. 22, 2023

(54) RADAR SYSTEM HAVING A CLOCK PULSE GENERATOR INTEGRATED INTO A CENTRAL CONTROL UNIT

(71) Applicant: Robert Bosch GmbH, Stuttgart (DE)

(72) Inventors: Marcel Mayer, Lonsee (DE); Michael Schoor, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 244 days.

(21) Appl. No.: 16/765,466

(22) PCT Filed: Nov. 8, 2018

(86) PCT No.: PCT/EP2018/080638
§ 371 (c)(1),
(2) Date: May 19, 2020

(87) PCT Pub. No.: WO2019/137654
PCT Pub. Date: Jul. 18, 2019

(65) Prior Publication Data
US 2020/0278436 A1 Sep. 3, 2020

(30) Foreign Application Priority Data

Jan. 11, 2018 (DE) .......................... 102018200395.5

(51) Int. Cl.
*G01S 13/34* (2006.01)
*G01S 7/00* (2006.01)
(Continued)

(52) U.S. Cl.
CPC .............. *G01S 13/34* (2013.01); *G01S 7/003* (2013.01); *G01S 7/03* (2013.01); *G01S 7/35* (2013.01); *G01S 13/931* (2013.01)

(58) Field of Classification Search
CPC . G01S 7/03; G01S 13/34; G01S 13/87; G01S 13/931; G01S 7/003; G01S 7/35;
(Continued)

(56) References Cited

U.S. PATENT DOCUMENTS 7,215,278 B2 * 5/2007 Bandhauer .......... G01S 13/0209
342/159
7,423,577 B1 * 9/2008 McIntire ................. G01S 7/006
375/295
(Continued)

FOREIGN PATENT DOCUMENTS

DE   102015219612 A1   4/2017
JP   2006014326 A      1/2006
(Continued)

OTHER PUBLICATIONS

International Search Report for PCT/EP2018/080638, dated Jan. 24, 2019.

*Primary Examiner* — Peter M Bythrow
(74) *Attorney, Agent, or Firm* — Norton Rose Fulbright US LLP; Gerard Messina

(57) ABSTRACT

A radar system for a vehicle. The radar system has at least one central control unit for transmitting data and for processing received data, at least one radar sensor head, which is set apart from the central control unit and has at least one transmitting antenna for generating and at least one receiving antenna for receiving radar waves, and having at least one data line between the at least one central control unit and the at least one radar sensor head, with the at least one central control unit having a clock pulse generator for generating a reference frequency and the reference frequency being transmittable via the at least one data line to the at least one radar sensor head.

8 Claims, 1 Drawing Sheet

(51) Int. Cl.
    *G01S 7/35*     (2006.01)
    *G01S 13/931*     (2020.01)
    *G01S 7/03*     (2006.01)

(58) Field of Classification Search
    CPC ... G01S 2013/9318; G01S 2013/93185; G01S 2013/9319; G02S 7/03
    See application file for complete search history.

(56) References Cited

U.S. PATENT DOCUMENTS

| | | | |
|---|---|---|---|
| 8,212,715 B2* | 7/2012 | Himmelstoss | G01S 7/35 342/134 |
| 2008/0204322 A1* | 8/2008 | Oswald | G01S 5/04 342/465 |
| 2013/0182816 A1* | 7/2013 | Skripek | H03K 23/42 377/47 |
| 2014/0194793 A1* | 7/2014 | Nakata | G01S 13/825 601/48 |
| 2014/0334584 A1* | 11/2014 | Lakkis | H03L 7/0996 375/376 |
| 2016/0018511 A1* | 1/2016 | Nayyar | G01S 7/03 342/27 |
| 2017/0090015 A1 | 3/2017 | Breen et al. | |
| 2017/0153314 A1 | 6/2017 | Siemes | |

FOREIGN PATENT DOCUMENTS

| | | |
|---|---|---|
| JP | 2015019189 A | 1/2015 |
| JP | 2015076805 A | 4/2015 |

\* cited by examiner

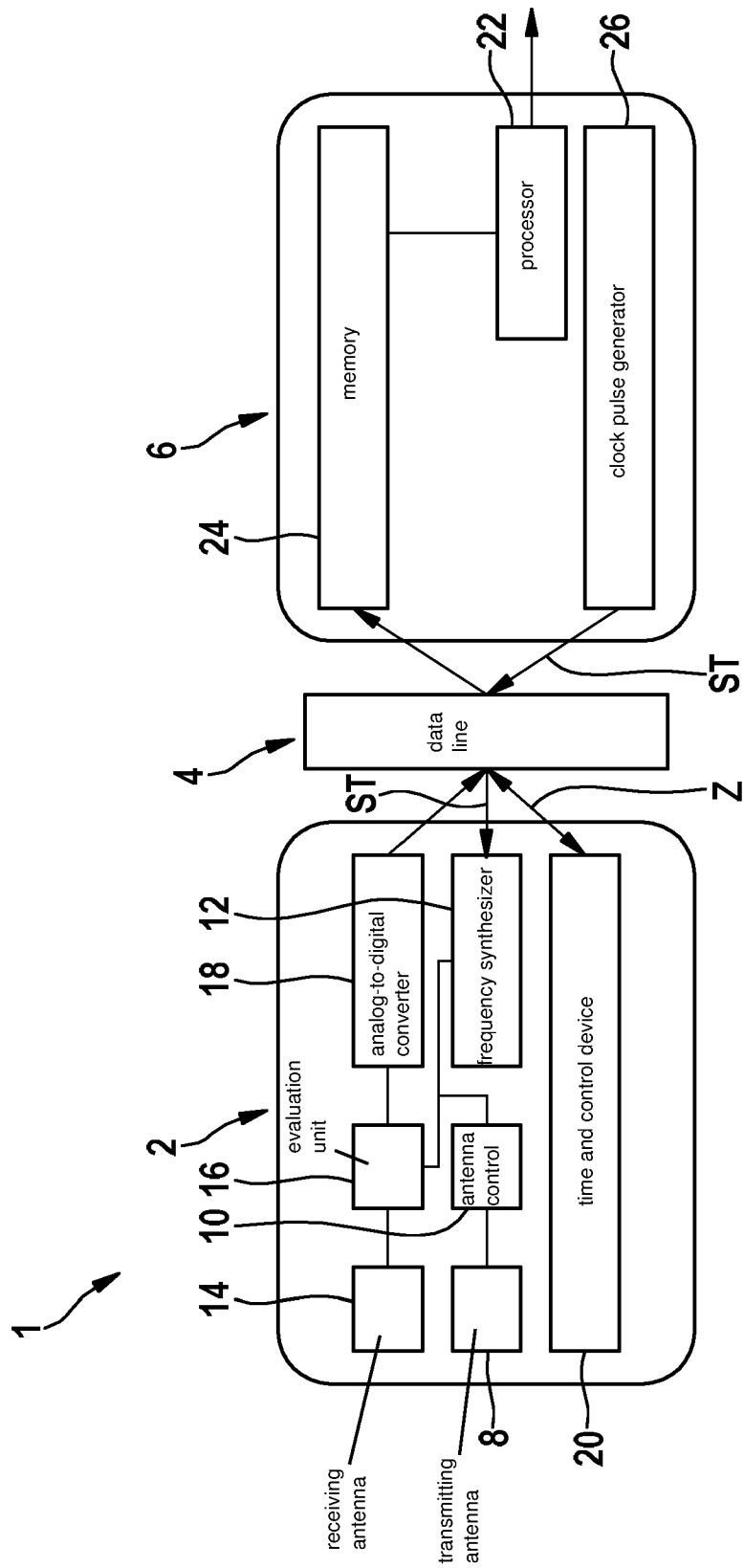

RADAR SYSTEM HAVING A CLOCK PULSE GENERATOR INTEGRATED INTO A CENTRAL CONTROL UNIT

FIELD

The present invention relates to a radar system for a vehicle, which has a central control unit for transmitting data and for processing received data, at least one radar sensor head, which is set apart from the central control unit and has at least one transmitting antenna for generating and at least one receiving antenna for receiving radar waves, and at least one data line between the central control unit and the at least one radar sensor head.

BACKGROUND INFORMATION

In vehicles that offer a high degree of driver assistance functions or automated driving functions, an ever increasing number of radar sensors is installed. Through a greater number of radar sensors, a higher performance of the automated or semi-automated driving functions is meant to be achieved in comparison with individual radar sensors. Current solutions in this area are radar sensors which carry out extensive data processing of the received radar waves within the sensor. The radar sensors are thus able to supply data at an object or location level for the further evaluation by the vehicle. This makes it possible to reduce the data quantity transmitted to the vehicle, but the respective radar sensors have to have a greater processing power and a larger memory.

Disadvantageous in this case is that the processing power and the memory size are relatively difficult to scale with regard to a greater performance. This is a consequence in particular of the fact that based on a defined demand on the capacity, the microcontroller technology for the required processing steps of the received radar waves is no longer sufficient. To increase the capacity, the required calculations and analyses thus have to be carried out inside the sensor within the framework of microprocessor technologies. This may have a disadvantageous effect on the price, size and on power losses of a radar sensor.

In addition, the different used radar sensors usually have insufficient or lacking coherence. This may especially be the result of oscillators that are separately locally installed in the radar sensors for the specification of a frequency.

SUMMARY

An object of the present invention is to provide a radar system for vehicles which is scalable in its capacity in a cost-effective and flexible manner and in which the individual radar sensor heads are able to be synchronized with one another.

This object may be achieved by example embodiments of the present invention. Advantageous embodiments of the present invention are described herein.

According to one aspect of the present invention, an example radar system is provided for a vehicle. The example radar system has at least one central control unit for transmitting data and for processing received data. In addition, the radar system has at least one radar sensor head, which is set apart from the central control unit and has at least one transmitting antenna for generating radar waves and at least one receiving antenna for receiving radar waves. The radar system includes at least one data line between the at least one central control unit and the at least one radar sensor head for the transmission of data. According to the present invention, the at least one central control unit has a clock pulse generator for generating a reference frequency, with the reference frequency being transmittable via the at least one data line to the at least one radar sensor head.

Under the aspect that a plurality of radar sensors is employed in a vehicle, it is advantageous to concentrate the required computing power in at least one central control unit. The respective radar sensors could thus be developed as compact and cost-effective radar sensor heads without any significant power losses. This makes it possible to realize an overall more optimal price-performance ratio and a higher performance of the radar system.

In the radar system according to the present invention, the at least one radar sensor head includes components for generating and transmitting radar waves as well as components for receiving and processing received radar waves. The processing of the received radar waves is kept to a minimum or is carried out at the lowest expense possible. In particular, the measured data of the received radar waves are able to be digitized by the analog-to-digital converter and then be transmitted at a high bandwidth to the at least one central control unit. The further processing of the digitized measuring data from the at least one radar sensor head may subsequently be performed in the at least one central control unit.

This makes it possible to reduce the expense for the respective radar sensor heads because the individual radar sensor heads require less processing power. In addition, a power loss in the respective radar sensor heads may be lower on account of the smaller number of processing steps. Although the computational effort becomes greater in the at least one central control unit, the computing power is more easily scalable or is scalable with less effort in comparison with the arising costs. In an overall view of the radar system, the radar system according to the present invention is able to be expanded and scaled in a cost-effective and flexible manner in comparison with current solutions. In addition, more complex and more efficient algorithms are able to be used for processing the received radar waves because of the higher computing power of the at least one central control unit.

In a radar sensor network, the coherence is a decisive variable when the data from different radar sensors or radar sensor heads are to be fused to a lower level, such as the spectral level. As a rule, the high frequency is generated separately in each radar sensor with the aid of a local oscillator and a phase-locked loop as the frequency synthesizer. The reference of the phase-locked loop is generated via a local quartz oscillator. As a result, however, the coherence between the radar sensors is very low or non-existent. With the aid of the radar system according to the present invention, the local oscillators as individual clock pulse generators are able to be replaced with slight deviations by a central clock pulse generator. The central clock pulse generator is preferably situated in the at least one central control unit. The central clock pulse generator is able to supply a reference frequency to the at least one radar sensor head, which is able to be transmitted via the at least one data line. The at least one data line may thus be used directly for the synchronization of the oscillators of different radar sensor heads by specifying a reference frequency.

The at least one data line is preferably developed as what is termed a high speed interface. The at least one data line may be embodied as a serial data transmission featuring a clock pulse recuperation. This makes it possible to ensure a coherence of the local oscillators of different radar sensor heads. Above all, the coherence may be ensured in a loop bandwidth of the phase-locked loop. The phase noise is a function of the clock pulse generator in this instance. The greater the loop bandwidth, the greater the frequency range within which coherence is available. The configuration of the loop bandwidth also depends on how satisfactory the reference frequency is with regard to the phase noise and the frequency at which the phase-locked loop is operated. In the case of rapid interfaces or data lines, a high frequency is used as a rule, which may be advantageous for a phase-locked loop as the reference frequency in comparison with a CAN bus.

According to one exemplary embodiment of the radar system in accordance with the present invention, the reference frequency generated by the clock pulse generator is variably adjustable. For example, the clock pulse generator disposed in the at least one central control unit may be a voltage-controlled oscillator or a numerically-controlled oscillator. In this way, the generatable reference frequency of the oscillator is able to be influenced directly or indirectly. The variably adjustable reference frequency may then be transmitted via the at least one data line to the at least one radar sensor head, where it is able to be used for operating the at least one transmitting antenna. The at least one radar sensor head is therefore able to be adapted to different measuring scenarios.

According to a further exemplary embodiment of the radar system in accordance with the present invention, the at least one radar sensor head has an antenna control of the at least one transmitting antenna including a frequency synthesizer. The frequency synthesizer may be embodied in the form of a phase-locked loop for operating a local oscillator. This makes it possible to generate and modulate a carrier frequency for the at least one transmitting antenna in a technically uncomplicated manner.

According to another exemplary embodiment of the radar system in accordance with the present invention, the clock pulse generator of the at least one central control unit is able to supply the reference frequency of the frequency synthesizer. In this way the reference frequency generated in the at least one central control unit by the clock pulse generator may be used for operating the at least one transmitting antenna of the at least one radar sensor head independently of a local oscillator of the at least one radar sensor head. In addition to ensuring a coherence when a plurality of radar sensor heads is used, redundancy in the generation of frequencies for the respective transmitting antennas is able to be realized in this way.

According to another exemplary embodiment of the radar system in accordance with the present invention, the radar waves received by the at least one receiving antenna of the at least one radar sensor head are able to be converted into digital measuring data with the aid of an analog-to-digital converter and be marked by at least one time datum. In this way, the received radar waves or measuring data are able to be converted into a digital format and thus be further processed in a less complicated manner. The measuring data converted into a digital format may advantageously be provided with a time stamp. For example, each recorded spectrum may receive its own time stamp.

According to a further exemplary embodiment of the radar sensor in accordance with the present invention, the digital measuring data are transmittable via the at least one data line to the central control unit and able to be synchronized in the central control unit using the at least one time datum. Because of the initial processing of the received measuring data in the radar sensor head, buffering or a delay on account of the arising data quantity may also occur. The resulting deviations between the at least one radar sensor head and the at least one central control unit are able to be compensated for on the basis of the assigned time information. The time information may preferably be realized in the form of a time stamp or a plurality of time stamps. The time stamps may thus be used for a time synchronization of the measuring data between the at least one radar sensor head of the at least one central control unit. In this way, even measuring data that are transmitted to the at least one central control unit with a delay are able to be correctly classified in terms of time and used for further applications or calculations.

According to another exemplary embodiment of the radar system in accordance with the present invention, the at least one time datum is able to be generated by a time and control device situated in the at least one radar sensor head. The at least one radar sensor head may thus include an additional circuit, which is situated in parallel with the analog-to-digital converter. The time and control device, for instance, is able to receive and implement control commands transmitted via the at least one data line and to provide the digitized measuring data with precise time information. In addition, the time and control device is able to be used for a control of the at least one radar sensor head as well as for the monitoring control or a cycle control. In order to allow for a time synchronization to take place in the radar system, the time and control device, for example, has to add time stamps to the transmitted measuring data for each transmitted chirp or each transmitted cycle so that the at least one central control unit is able to utilize the transmitted measured data in a meaningful way.

According to a further exemplary embodiment of the radar system in accordance with the present invention, the frequency synthesizer has an oscillator for the supply of a frequency, which is situated in the at least one radar sensor head. This makes it possible to build the radar sensor heads from conventional components because frequency synthesizers are usually produced with a local oscillator in the form of an integrated circuit. The oscillator may be adjustable by the time and control device of the central control unit. Because the time and control device is implemented in the at least one radar sensor head, the components of the at least one radar sensor head are able to be influenced by the at least one central control unit. The oscillator or the oscillators of the at least one radar sensor head are thus able to be controlled or regulated, either directly or indirectly.

According to a further exemplary embodiment of the radar system in accordance with the present invention, the frequency supplied by the oscillator may be superposed by the reference frequency generated by the clock pulse generator of the at least one central control unit. Regardless of a frequency of the local oscillator, the reference frequency of the central clock pulse generator may therefore be used at a higher priority for the generation of radar waves by the at least one transmitting antenna.

According to an additional exemplary embodiment of the radar system in accordance with the present invention, the clock pulse generator of the at least one central control unit is able to synchronize frequency synthesizers of at least two radar sensor heads with each other. Multiple radar sensor heads that are set apart from one another may be installed in a vehicle and be connected in a data-transmitting manner to one or more central control unit(s) via data lines. When multiple radar sensor heads are used, the respective frequency synthesizers, and thus the carrier frequency of the transmitting antennas, are able to be synchronized with one another with the aid of the implemented time and control devices in the different radar sensor heads. As a result, it is possible to increase the accuracy of the measuring results. The driver-assistance functions or the automated driving functions of the vehicle are therefore able to be optimized. In addition, the number of used radar sensor heads may be increased as desired without any negative effects on the performance.

According to an additional exemplary embodiment of the radar system in accordance with the present invention, the data transmitted via the at least one data line are transmittable at a higher data rate than the reference frequency of the frequency synthesizer of the at least one radar sensor head. To allow for an optimal operation of the time and control device for the control or regulation of the at least one radar sensor head, the transmission of the data via the at least one data line must take place at a higher time resolution than the radar operation. In this way, further functions such as safety functions for monitoring frequency deviations of different oscillators are able to be integrated into the radar system according to the present invention. The higher time resolution for the data transmission is technically easy to realize within the scope of an MMIC technology because the technology allows for frequencies of multiple Gigahertz. A time stamp of 1 GHz, for instance, and a time resolution of 1 ns is therefore transmittable without any problems. The internal reference frequency, for example, may be 50 MHz for a PLL reference of the at least one transmitting antenna, which means that the data rate according to the example must be higher than 50 Mbit/s.

According to an additional exemplary embodiment of the radar system in accordance with the present invention, the at least one central control unit has at least one processor for the processing of received data and at least one memory for the at least intermittent storage of data. As a result, the at least one central control unit is able to store the measuring data from at least one radar sensor head transmitted via the at least one data line at least temporarily and process, forward or output it according to a request of the respective application. If required, the at least one central control unit is able to be exchanged for a more powerful control unit. Since microprocessor technology is already being employed here, complex algorithms for processing the measuring data may be used and more precise calculation results be achieved as a consequence.

Below, a preferred exemplary embodiment of the present invention is described in greater detail based on a heavily simplified schematic FIGURE.

BRIEF DESCRIPTION OF THE DRAWINGS

FIG. 1 shows an example radar system according to a first embodiment of the present invention.

DETAILED DESCRIPTION OF EXAMPLE EMBODIMENTS

FIG. 1 shows a schematic illustration of an example radar system 1 according to a first specific embodiment of the present invention. Radar system 1 is made up of a radar sensor head 2, which is coupled via a data line 4 with a central control unit 6.

Radar sensor head 2 has at least one transmitting antenna 8, which is operable via an antenna control 10. Antenna control 10 is connected to a frequency synthesizer 12 for the generation of a carrier frequency of the radar waves.

Frequency synthesizer 12 receives a reference frequency through data line 4 from central control unit 6 via digitally transmitted control commands ST.

In addition, at least one receiving antenna 14 including a corresponding evaluation unit 16 for receiving radar waves is situated in radar sensor head 2. The received radar waves are able to be converted into digital measuring data by an analog-to-digital converter 18 and then be transmitted via data line 4 to central control unit 6.

A time and control device 20 situated in radar sensor head 2 allocates a time stamp Z to the transmitted digital measuring data, which is also transmitted to central control unit 6.

Central control unit 6 is able to receive the transmitted digital measuring data and then further process the data. Because of time stamps Z transmitted together with the measuring data, the measuring data are able to be precisely categorized in terms of time.

Central control unit 6 has at least one processor 22 for the processing of received data, and at least one memory 24 for the at least intermittent storage of received digital measuring data. In addition, central control unit 6 has a clock pulse generator 26. With the aid of clock pulse generator 26, central control unit 6 is able to generate a reference frequency for synchronizing radar sensor head 2. The reference frequency may subsequently be received by frequency synthesizer 12 via data line 4.

What is claimed is:

1. A radar system for a vehicle, the radar system comprising:
a central control unit;
a plurality of radar sensor heads which each (a) is set apart from the central control unit and (b) includes a transmitting antenna for generating radar waves, a frequency synthesizer, a receiving antenna for receiving radar waves, which are reflections of the generated radar waves, and an analog-digital converter to convert the received radar waves into digital measuring data; and
at least one data line between the control unit and the plurality of radar sensor heads, wherein:
the central control unit (a) has a clock pulse generator configured to generate a reference frequency and (b) is configured to transmit the reference frequency via the at least one data line to each of the plurality of radar sensor heads;
the respective frequency synthesizers of each of the plurality of radar sensor heads is configured to implement the reference frequency transmitted by the central control unit to generate a carrier frequency of the generated radar waves of the respective radar sensor heads, wherein the radar system ensures that the data transmitted via the at least one data line are transmitted at a data rate of a number of bits per second that is higher than a value of hertz of the generated carrier frequency of the generated radar waves;
the plurality of radar sensor heads are configured to transmit, over the at least one data line, the digital measuring data generated by the respective analog-digital converters to the central control unit; and
the central control unit is configured to process the digital measuring data received from the plurality of radar sensor heads in time synchronization with one another.

2. The radar system as recited in claim 1, wherein the reference frequency generated by the clock pulse generator is variably adjustable.

3. The radar system as recited in claim 1, wherein the digital measuring data is marked by at least one time datum.

4. The radar system as recited in claim 3, wherein each of the plurality of radar sensor heads includes a respective time and control device configured to generate the at least one time datum.

5. The radar system as recited in claim 1, wherein the frequency synthesizers each has an oscillator for a supply of a frequency.

6. The radar system as recited in claim 5, wherein the frequency supplied by the oscillator is superposed by the reference frequency generated by the clock pulse generator of the central control unit.

7. The radar system as recited in claim 1, wherein the frequency synthesizers of the plurality of radar sensor heads are synchronized with one another by the transmission of the reference frequency from the central control unit to the plurality of radar sensor heads.

8. The radar system as recited in claim 1, wherein the central control unit has at least one processor configured to process received data and at least one memory for at least intermittent storage of data.

\* \* \* \* \*